Jan. 2, 1923.
W. J. LYNCH.
MANIFOLD FOR DISHWASHING MACHINES.
FILED MAY 1, 1920.
1,440,612
2 SHEETS-SHEET 1
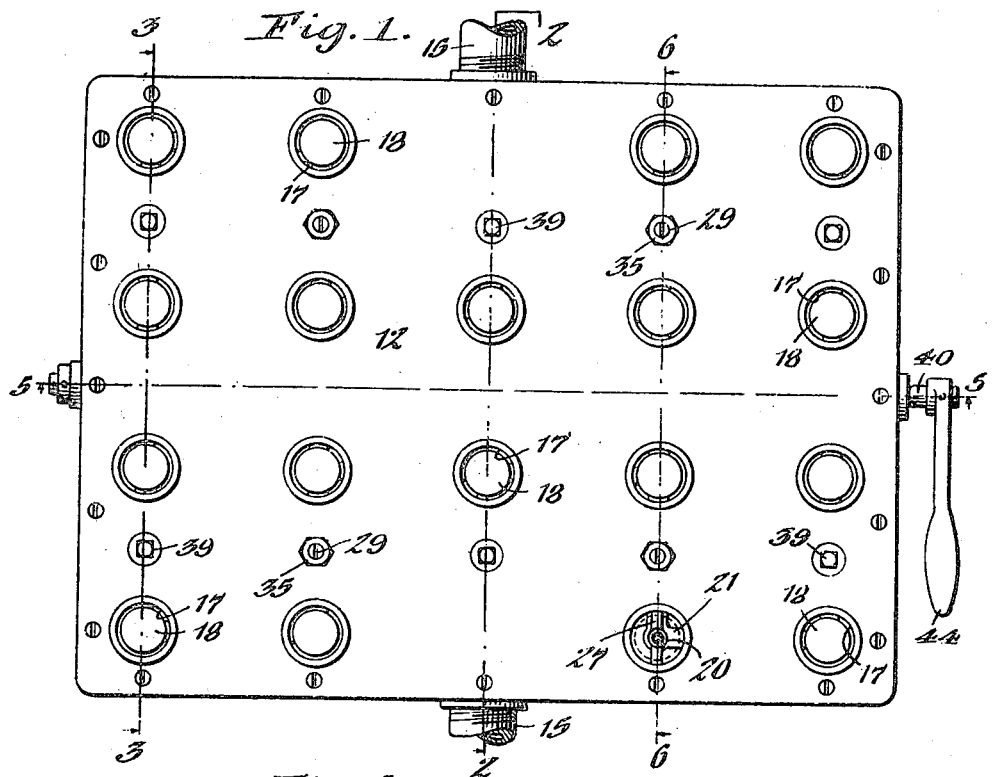
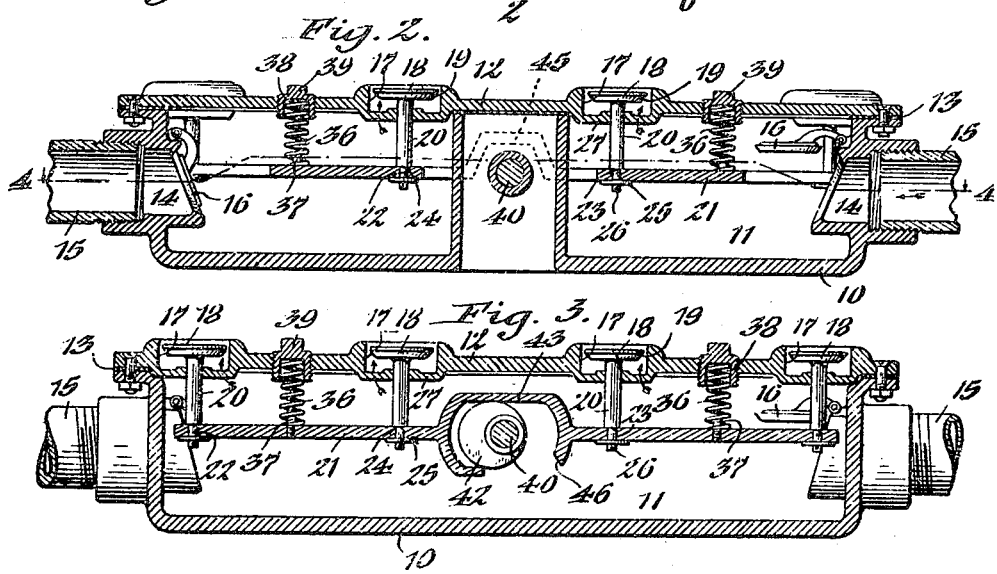
Inventor,
William J. Lynch
by Lyner & Popp
Attorneys.

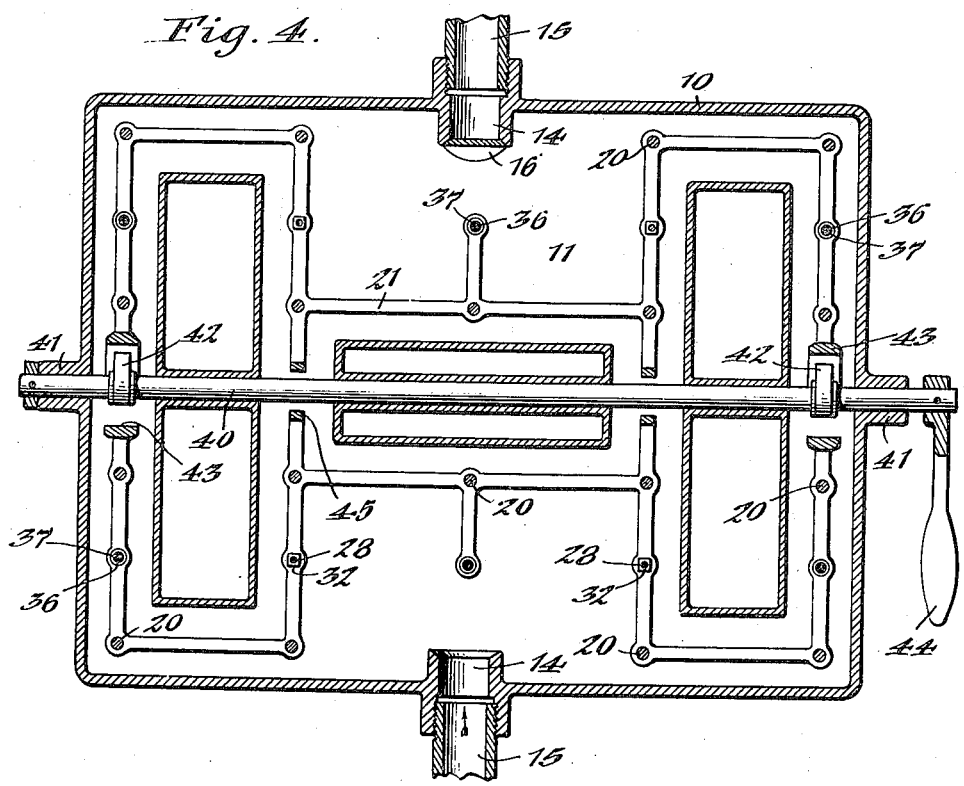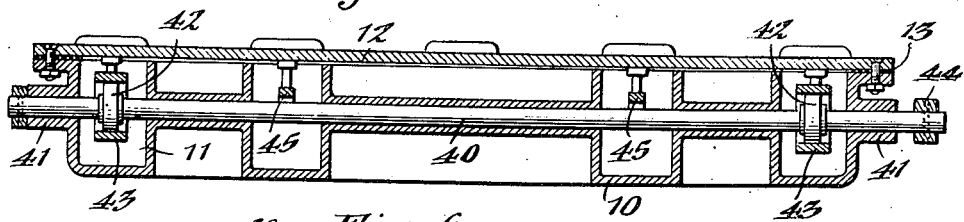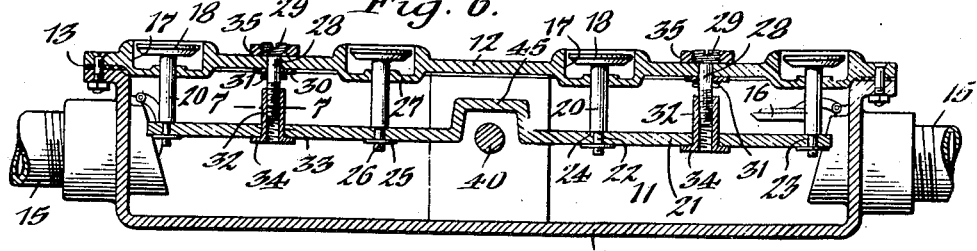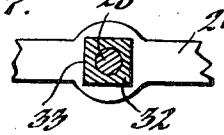

Patented Jan. 2, 1923.

1,440,612

UNITED STATES PATENT OFFICE.

WILLIAM J. LYNCH, OF BUFFALO, NEW YORK.

MANIFOLD FOR DISHWASHING MACHINES.

Application filed May 1, 1920. Serial No. 378,200.

*To all whom it may concern:*

Be it known that I, WILLIAM J. LYNCH, a citizen of the United States, residing in Buffalo, in the county of Erie and State of New York, have invented new and useful Improvements in Manifolds for Dishwashing Machines, of which the following is a specification.

This invention relates to a manifold or spraying device for dish washing machines and the like of the character shown in my co-pending application No. 328,998, filed October 7, 1919.

It is the object of this invention to provide a manifold of this character whereby the spray, which is directed upon the dishes passing through the machine, may be conveniently regulated and thereby control the force of the spray desired for different articles.

Another object is to provide a manifold which can be thoroughly cleaned from time to time without the necessity of shutting down the machine.

A still further object of the invention is to provide a device of this character which is simple and compact in construction and which is applicable for spraying dishes from above or below.

In the accompanying drawings:

Figure 1 is a top plan view of my improved manifold. Figures 2 and 3 are transverse sections on the correspondingly numbered lines in Fig. 1. Figure 4 is a horizontal section on line 4—4, Fig. 2. Figure 5 is a longitudinal section on line 5—5, Fig. 1. Figure 6 is a transverse section on line 6—6, Fig. 1. Figure 7 is a fragmentary horizontal section on line 7—7, Fig. 6.

Similar characters of reference refer to like parts throughout the several views.

The main frame of this improved manifold or spraying device preferably comprises a box or tank 10 of rectangular form open at its top and provided with a water chamber 11. The top of the box is closed by a suitable cover 12 bolted or otherwise secured thereto, a gasket 13 being interposed between the opposing edges of the cover and tank to make the same water tight. The opposite side walls of the tank are provided with inlet openings or ports 14 to each of which is connected a supply or intake pipe 15 communicating with the usual pump for forcing the water to this tank for spraying purposes. The inlet ports 14 are provided with suitable check valves 16 controlled by the pressure of the water admitted to the box, so that when water is conducted through one port, its check valve is opened by the pressure of the water, while the other valve is closed, it being understood that either one pump or the other is connected to the manifold at a time. The intake pipes 15 also serve as a means to support the tank in a horizontal position above or below the dishes being washed.

The cover 12 of the tank 10 is provided with a plurality of circular openings or ports 17 through which the water for spraying purposes is discharged, the size of the spray being regulated by valves 18, one of which is arranged in each port. These valves are also of circular form and are of slightly smaller diameter than the corresponding ports, the water being discharged between the face of each valve and the corresponding port. These ports are preferably arranged in parallel rows across the cover and the valves therein are of the mushroom type, each having a conical or outwardly diverging head 19 and a depending stem 20. The lower ends of these stems are rigidly secured to a rack, or supporting frame 21 of skeleton-like form arranged horizontally in the water chamber 11 of the box and adapted to be adjusted vertically in said chamber and thereby effect a corresponding movement of these valves relatively to their ports to vary the breadth and force of the spray. The stems of the valves may be securely fastened to the supporting frame in any suitable manner, but preferably by providing the lower end of each stem with a reduced portion 22 which engages an opening 23 in said supporting frame. The shoulder 24 formed by the reduced portion 21 engages the corresponding upper side of the supporting frame, while that part of the reduced portion extending through the opening 23 is provided with a collar or washer 25 held against the underside of the supporting frame by a cotter pin 26 or other suitable means. The upper end of each valve stem may be guided in a bridge or cross piece 27 formed integral with the cover and extending diametrically across the respective port, as shown in Fig. 1.

The means for adjusting the valve supporting frame so as to vary the breadth and force of the spray are preferably constructed as follows:

Carried by the cover 12 are a plurality of adjusting units which comprise adjusting bolts or screws 28, each of which is provided with a screw-threaded head portion 29 at its upper end. Each of these bolts is prevented from movement vertically relatively to the cover, and for this purpose is provided with a collar or washer 30 held against the underside of said cover by a cotter pin 31, or other suitable means, the shoulder formed by the screw threaded head bearing against the upper side of the cover. The supporting frame is provided with a plurality of guide members or adjusting sleeves 32 corresponding to the number of bolts 28, and each is provided with a screw-threaded bore for receiving the screw threaded shank of the corresponding bolt. To prevent these sleeves from turning relatively to the bolts, they are of square cross section and engage square openings 33 in the valve supporting frame, the lower end of each sleeve being provided with a stop flange 34 for supporting said frame in the tank and for preventing upward movement of the sleeve relatively to the valve frame. A lock nut 35 engaging the head of each bolt serves to lock the latter in a set position after the supporting frame is adjusted properly for a certain breadth of spray. As shown in the drawings, there are four of these adjusting units, arranged equidistant from each other to permit a more uniform adjustment of the valve supporting frame.

This valve supporting frame is also yieldingly retained in its operative position at its opposite ends and midway thereof, so as to effect a more uniform and accurate movement of the several valves mounted thereon when they are being adjusted for a certain breadth of spray. The means for thus yieldingly retaining the valve frame comprise a plurality of coil springs 36 interposed between the upper side of said frame and the lower side of the box cover 12. To prevent these springs from becoming displaced, the lower end of each spring surrounds a stud or pin 37 in the valve frame, while its upper end is seated in a recess or socket 38 formed in a plug 39 screwed into the cover.

Means are provided for bodily raising the valve supporting frame to a position in which the several valves will clear the upper edges of their respective ports, and thereby permit of flushing the box of any particles of refuse which are removed from the dishes during the washing thereof, and prevent any clogging of the spraying system which might otherwise impair its operation. The preferred mechanism, whereby this bodily movement of the valve frame is effected is constructed as follows:

40 represents a horizontal rotatable shaft arranged centrally and lengthwise of the tank 10 and journaled in bearings 41 at opposite ends thereof. Mounted at opposite ends of this shaft and within the water chamber 11 of the tank are cams or eccentrics 42, each of which engages a yoke 43 provided in the respective end of the valve supporting frame. Upon rotating this shaft the frame 21, through the medium of the eccentrics 42, is raised uniformly and simultaneously causes the valves to be lifted and flushes the tank of any refuse particles deposited therein. In this event, the sleeves 32 of the valve adjusting units serve as guides for the valve frame, and the springs 36 cause the latter to return to its normal operative position when the shaft is moved to its former position. For conveniently rotating this shaft, a suitable hand lever 44 is fixed to the exposed end of the shaft 40.

It will be understood from the foregoing that when it is desired to produce a spray from this improved manifold to be directed upwardly in a substantially vertical column with maximum force, the valves are set in the position shown in the drawings in which the upper faces of the valves are just below the upper end of the respective ports. However, should it be desired to produce a spray covering a larger area with a diminished force the valve frame is adjusted accordingly so that the valves are moved farther outward, and the upper faces of the valves are either flush with the upper end of the ports, or extend beyond the same, which last position results in a coarse spray of inverted conical form covering a maximum area with a minimum of force.

The intermediate portions of the valve supporting frame are provided with offsets 45 to prevent the same from interfering with the actuating shaft 40 during the raising and lowering of the valve frame.

In assembling this improved manifold, the cover and associated parts including the valve supporting frame, the valves, adjusting units and yieldable retainers are assembled as a unit, and applied to the tank 10 in which is journaled the shaft on which the eccentrics are mounted. In order to permit the yokes of the valve frame to fit over their eccentrics in applying the cover to the box, they are cut open on their undersides as shown at 46. This permits of ready assemblage of the parts without in any way impairing the function of the yokes.

I claim as my invention:

1. A manifold of the character described comprising a tank of box-like form communicating with water under pressure and provided in one of its sides with outlet ports, a valve supporting frame arranged within said tank and movable toward and from said ports, valves carried by said frame and extending into said ports, and adjusting screws extending through one wall of said tank and engaging said valve frame.

2. A manifold of the character described comprising a tank communicating with water under pressure, a cover therefor provided with outlet ports, a supporting frame adjustably mounted on said cover and disposed within said tank, and valves carried by said frame and extending into said ports.

3. A manifold of the character described comprising a tank communicating with water under pressure, a cover therefor provided with outlet ports, a supporting frame guided on said cover, valves carried by said frame and extending into said ports, and means for adjusting said frame vertically toward and from said cover whereby said valves are simultaneously adjusted to control the discharge of water through said ports.

4. A manifold of the character described comprising a tank communicating with water under pressure, a cover therefor having outlet ports therein, a supporting frame guided on said cover, valves carried by said frame and extending into said ports, and a plurality of adjusting screws mounted on said cover and operatively connected to said frame.

5. A manifold of the character described comprising a tank communicating with water under pressure and provided in one of its sides with outlet ports, a valve supporting frame arranged within said tank, valves carried by said frame and extending into said ports, means for adjusting said frame whereby said valves are adjusted to control the discharge of water through said ports, and means independent of said adjusting means for actuating said valve frame to simultaneously lift said valves above the discharge end of said ports.

6. A manifold of the character described comprising a tank communicating with water under pressure and provided with outlet ports, a vertically movable valve supporting frame yieldingly guided in said tank and provided at its opposite ends with yokes, valves carried by said frame and extending into said ports, a rotatable shaft journaled in said tank, and eccentrics mounted on said shaft and engaging the yokes of said frame.

7. A manifold of the character described comprising a tank communicating with water under pressure and provided with outlet ports, a vertically movable valve supporting frame guided in said tank and provided at its opposite ends with yokes, valves carried by said frame and extending into said ports, a rotatable shaft journaled in said tank, and eccentrics mounted on said shaft and engaging the yokes of said frame, a portion of each of said yokes being provided with an opening for the reception of its eccentric.

WILLIAM J. LYNCH.